United States Patent [19]
Enochs

[11] Patent Number: 5,123,065
[45] Date of Patent: Jun. 16, 1992

[54] ELECTRO-OPTICAL TRANSDUCER MODULE

[75] Inventor: R. Scott Enochs, Gaston, Oreg.

[73] Assignee: Tektronix, Inc., Beaverton, Oreg.

[21] Appl. No.: 716,472

[22] Filed: Jun. 17, 1991

[51] Int. Cl.⁵ ............................................. G02B 6/10
[52] U.S. Cl. ............................................. 385/9; 385/8
[58] Field of Search ............... 350/96.12, 96.13, 96.14, 350/96.15, 96.10, 96.20; 385/8, 9, 10, 1, 2, 3, 4, 5, 6, 7

[56] References Cited

U.S. PATENT DOCUMENTS

| | | | |
|---|---|---|---|
| 3,795,433 | 3/1974 | Channin | 350/96.14 |
| 3,923,374 | 12/1975 | Martin | 350/96.14 |
| 3,990,775 | 11/1976 | Kaminow et al. | 350/96.14 |
| 4,005,927 | 2/1977 | Caton | 350/96.14 |
| 4,667,331 | 5/1987 | Alferness et al. | 350/96.14 X |
| 4,722,586 | 2/1988 | Dodson et al. | 350/96.20 |
| 4,776,656 | 10/1988 | Sanford et al. | 350/96.14 |
| 4,997,253 | 5/1991 | Enochs | 350/96.10 |

*Primary Examiner*—John D. Lee
*Assistant Examiner*—Phan T. Heartney
*Attorney, Agent, or Firm*—William K. Bucher

[57] ABSTRACT

An electro-optical transducer module assembly has a substrate on which is secured a guided-wave transducer having an optical waveguide and electrode structure formed on one surface thereof with the waveguide surface in a facing relationship with the substrate. Spacers are provided to position the transducer above the substrate surface and means are provided to electrically connect the electrode structure with the substrate. Optical waveguides are affixed to the substrate adjacent to the transducer for coupling an optical signal into and out of the transducer.

10 Claims, 2 Drawing Sheets

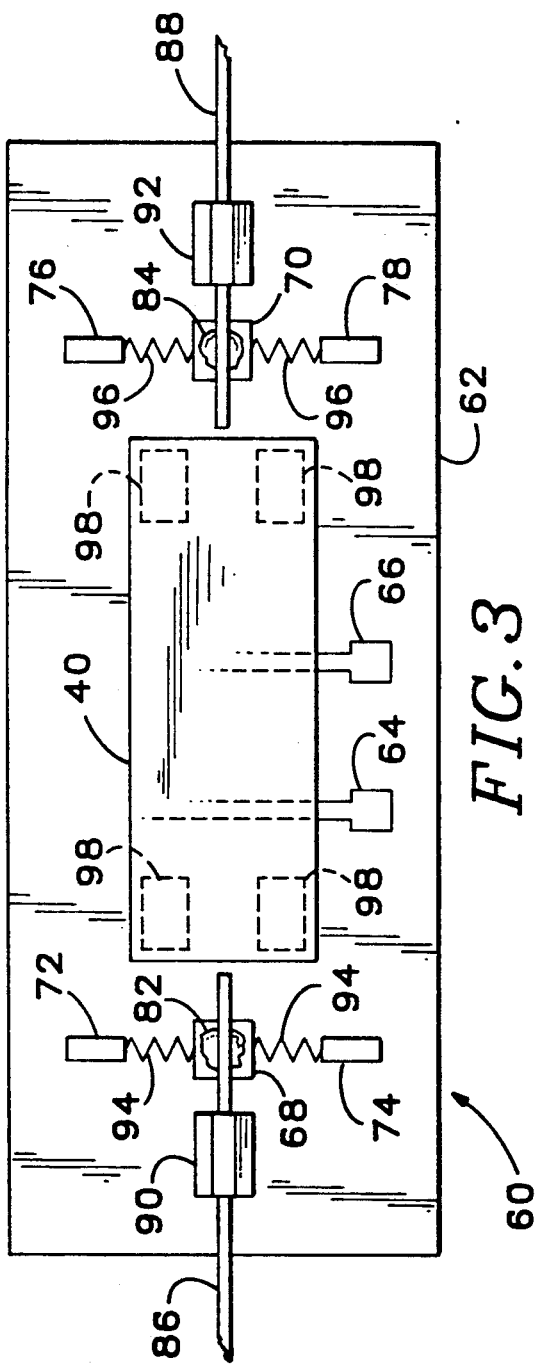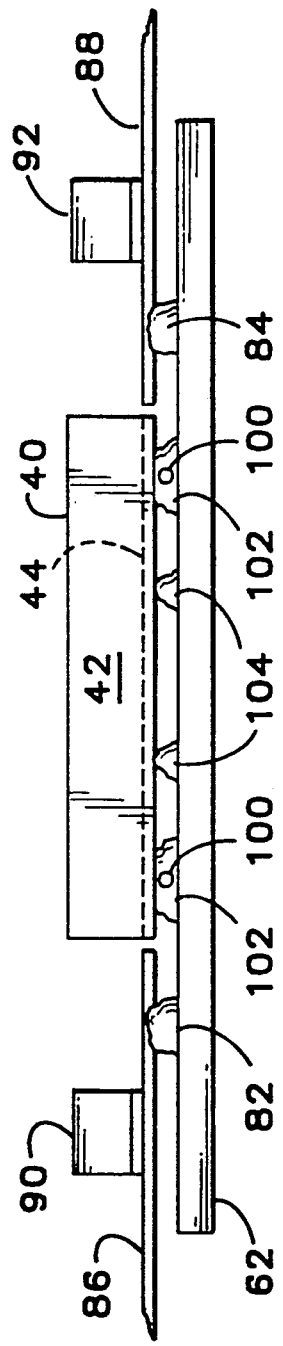

ELECTRO-OPTICAL TRANSDUCER MODULE

BACKGROUND OF THE INVENTION

The present invention related to electro-optical transducer modules and more specifically to an electro-optical transducer module having an inverted electro-optic guided-wave transducer.

Electro-optical transducer modules are a broad class of devices for generating or modulating optical signals in response to electrical signals Electro-optical transducer modules generally have optical waveguide inputs and/or outputs for coupling optical signals into and/or out of the module. Within the module, the optical waveguides are accurately positioned relative to the electro-optical transducer for receiving the optical signals into or transmitting the optical signal out of the transducer Generally the positioning accuracy between the waveguides and the transducer is in the tenth of microns This accuracy requirement places severe constraints on the packaging design for these modules.

U.S. Pat. Nos. 4,772,586 and 4,997,253 describe one class of electro-optical transducer modules having lazing electro-optical transducers for generating optical outputs into optical fiber waveguides In the '586 patent, the transducer module has a base member with a flat surface and a platform upstanding from the flat surface where the laser is positioned. The optical fiber is soldered to a fiber mount plate which is positioned relative to the laser and then solder to the base member. In the '253 patent, the transducer module has a flat substrate with a laser diode die soldered directly to the substrate. The optical fiber has a handling element adhered to it for positioning the fiber relative to the laser diode. The optical fiber is soldered directly to the substrate when optimum alignment is achieved between the fiber and the diode.

Another class of electro-optical transducer modules are designed for switching, modulating or phase-shifting an input optical signal. These modules have an electro-optic guided-wave transducer made of a crystalline material, such as lithium niobate, $LiNbO_3$, lithium tantalate, $LiTaO_3$, or the like, with an optical waveguide formed in one surface of the crystalline material and electrodes formed relative to the optical waveguide for providing an electrical signal to the transducer for performing the switching, modulating or phase-shifting function. Generally, the transducer is mounted on a substrate in the transducer module with the waveguide and electrode structure oriented opposite the substrate. FIG. 1 shows a $Ti:LiNbO_3$ directional coupler developed by AT&T Bell Laboratories, Holmdel, N.J., and described in the IEEE Journal of Lightwave Technology, Volume LT-3, No. 1, February, 1985. The electro-optical directional coupler has a housing 10 with a support block 12 onto which is secured the $LiNbO_3$ crystal 14. A titanium diffused waveguide directional coupler 16 is formed in one surface of the crystal 14 and an asymmetric coplanar stripline 18 is formed on the same surface for the electrode. The waveguide surface of the crystal transducer 14 is positioned face-up on the support block 12 within the housing 10. An in-plane side-feed arrangement is used to provide a RF and DC input 20 and termination 22 to the stripline electrode 18 via coaxial cables. Single mode fibers 24, 26 and 28 with 8 micron cores and 125 micron cladding diameters are pigtailed to three of the four input/output waveguides of the directional coupler 16. The fibers are permanently fixed in alignment to the waveguides using a silicon V-groove array technique. The fibers are first placed in the silicon V-groove array 30 and the end of the array is polished. The array is then aligned with the waveguide of the directional coupler 16 and bonded to the crystal 14 using UV cured epoxy having an index of refraction nearly matching the fiber. The fibers in the V-groove array 30 are laterally aligned to within 0.5 microns of the waveguides of the directional coupler 16. Strain relief for the fibers is provided by capturing the cables in the device housing.

The design of the above described directional coupler transducer module requires the precise formation of both the waveguide within the $LiNbO_3$ crystal and the V-groove array containing the optical fibers. Maintaining tolerances in the submicron range would be very difficult in any large scale manufacturing effort for a design of this type.

What is needed is an electro-optical transducer module having an electro-optic guided-wave transducer wherein the submicron tolerances between the transducer and connecting optical waveguides are easily maintained on an individual waveguide-to-transducer basis while at the same time providing ease of manufacturing of the transducer module.

SUMMARY OF THE INVENTION

Accordingly the present invention is an electro-optical transducer module having a substrate with a planar face and an electro-optical transducer with an optical waveguide and electrode structure formed on one surface of the transducer with the waveguide in a facing relationship with the substrate. The electro-optical transducer is positioned above the planar surface of the substrate with spacing elements and is secured to the substrate by securing means. Electrical connections are provided from the substrate to the electrode structure. Optical waveguides are affixed to the substrate adjacent to the electro-optical transducer for coupling an optical signal into the transducer waveguide and receiving the optical signal from the transducer waveguide. In one aspect of the invention the positioning means and the securing means are coextensive, with the spacing elements being within solder columns of the securing means. In a further aspect of the invention the securing means and the electrical connections are one in the same. The objects, advantages and novel features of the present invention are apparent from the following detailed description when read in conjunction with appended claims and attached drawings.

BRIEF DESCRIPTION OF THE DRAWINGS

FIG. 3 is a plan view of the electro-optical transducer module according to the present invention.

FIG. 4 is a side view of the electro-optical transducer module according to the present invention.

DETAILED DESCRIPTION OF THE PREFERRED EMBODIMENT

Figure 1:
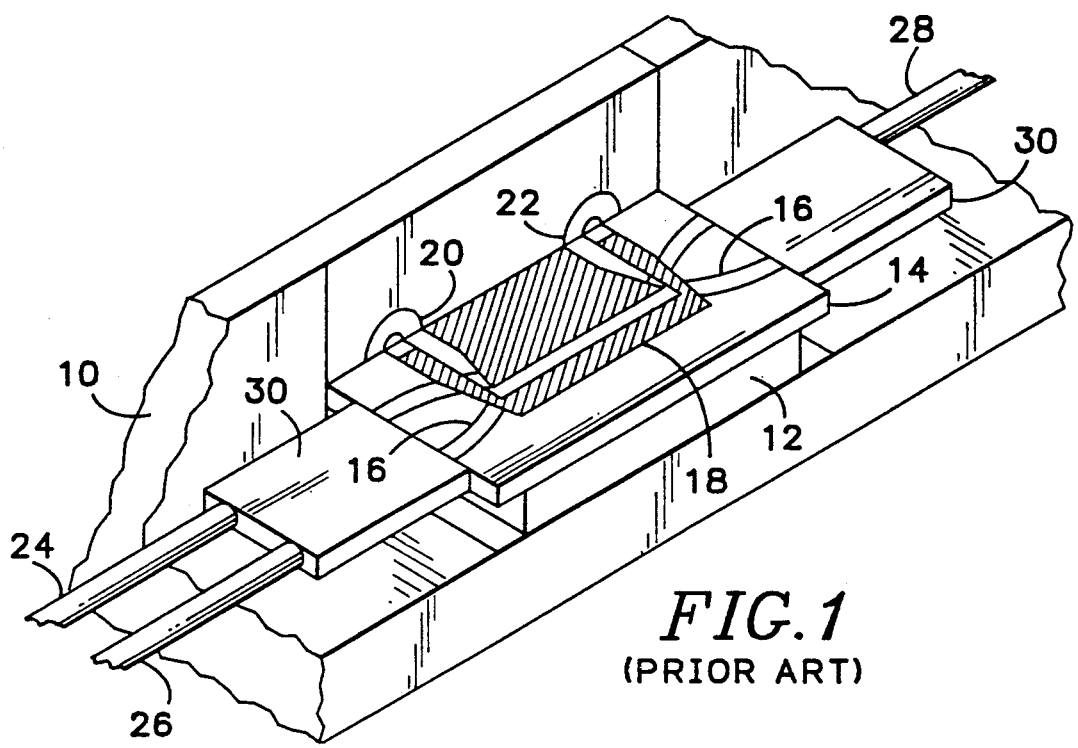
FIG. 1 is perspective view of a prior art directional coupler electro-optical transducer module.
Figure 2:
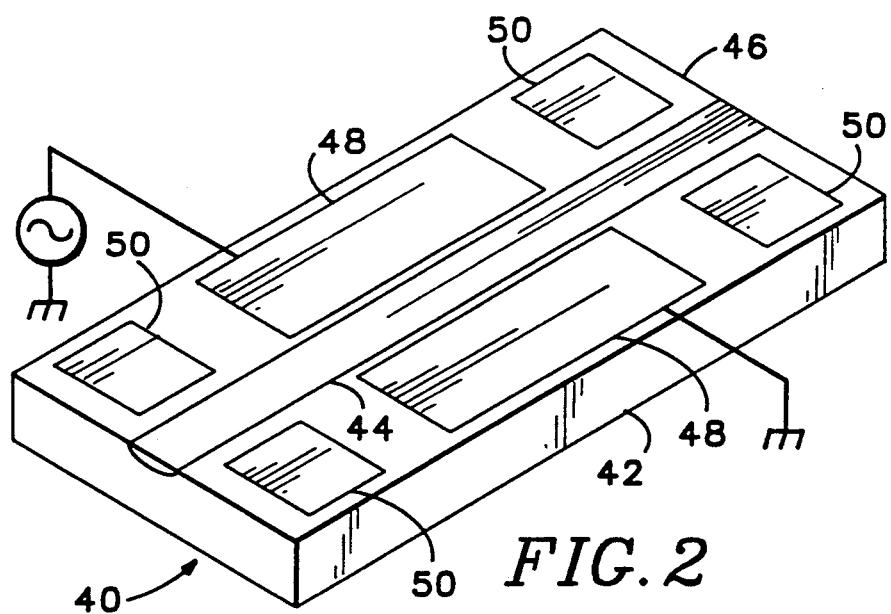
FIG. 2 is a perspective view of a representative electro-optical transducer for use in the electro-optical transducer module according to the present invention.

FIG. 2 shows a perspective view of a representative electro-optical transducer 40 having a lithium niobate, $LiNbO_3$, substrate 42 with an optical waveguide 44 formed on one surface 46 of the LiNbO₃ substrate 42 by diffusing a strip of titanium into the substrate at elevated temperature. The design parameters for the electro-optical transducer 40 determines the thickness of the waveguide structure formed in the transducer 40 with the thickness of the waveguide being in the general range of 40-80 microns. Electrode structures 48 are plated onto the surface 46 to form a coplanar microwave waveguide. It is understood that other materials, such as lithium tantalate, LiTaO₃, and the like, having optical properties similar to lithium niobate may be used for the electro-optical transducer 40. Additionally, a variety of optical and microwave waveguide structures may be formed in the substrate 42 for producing various type of electro-optical transducers, such as directional couplers, switches, phase shifters and the like. Contact areas 50 are formed on surface 46 that are used in securing the electro-optical transducer 40 within the electro-optical transducer module in a face-down orientation as described in greater detail below.

Referring to FIG. 3 there is shown a plan view of the preferred embodiment of the electro-optical transducer module 60. The module 60 has a ceramic substrate 62 with a planar surface on which is secured the electro-optical transducer 40 in a face-down orientation. In the preferred embodiment the ceramic substrate 62 is Al₂O₃ having a thickness of 10 mils. It is understood that other materials with different thicknesses may be used for the substrate 62 without depart from the scope of the invention as long as the new substrate material has similar properties to the 10 mil thick Al₂O₃ substrate. The substrate 62 has metallized areas 64-80 formed thereon for providing electrical connections to various elements of the transducer module 60 and for securing the elements to the substrate 62. The thickness of the metallization areas 64-80 is typically in the range of 10-12 microns. Metallized areas 64 and 66 provide an electrical path on the substrate 62 for connecting an external source of RF or microwave power (not shown) to the electrode structure 48 of transducer 40. Metallized areas 68 and 70 have solder preforms 82 and 84 affixed thereto that are heated for securing optical waveguides 86 and 88 to the substrate 62. The solder preforms may be gold-tin alloy with an 80 wt % Au-20 wt % Sn having a melting point at 280 degree C. In the preferred embodiment, the optical waveguides are optical fibers for coupling an optical signal into and out of the electro-optical transducer 40. The optical fibers 86 and 88 are prepared for use in the electro-optical transducer module 60 by removing the protective covering and buffer layers, if any, from the cladding layers surrounding the cores of the optical fibers. The diameter of a single mode fiber is typically 125 microns with the protective covering removed thus defining the central axis of the fiber at approximately 62.5 microns from the outside edge of the fiber. A solderable metallization is applied to the exposed segment of the fibers and the end face of each fiber is cleaved or lensed. T-shaped handling elements 90 and 92 are affixed to the optical fibers 86 and 88. The handling elements 90 and 92 are gripped in the jaws of a micromanipulator (not shown) by the stem of the T-shaped section for positioning the optical fibers 86 and 88 relative to the optical waveguide 44 in the electro-optical transducer 40. Metallized areas 98 are formed on the substrate 62 that are coextensive with the contact areas 50 on the electro-optical transducer 40 for securing the transducer 40 in the face-down orientation.

Resistors 94 and 96 are formed on the substrate 62 at the approximate locations of the metallized areas 68 and 70 and respectively bridge metallization layers 72-74 and 76-78. The resistors 94 and 96 are heat sources for melting the solder preforms 82 and 84 to secure the optical fibers 86 and 88 to the substrate 62. Resistors 94 and 96 are heated by passing a current through them via the metallized areas 72-78. Resistors 94 and 96 may be formed on the substrate 62 using known thick or thin film processing techniques.

The side view of the electro-optical transducer module 60 in FIG. 4 shows the surface of the electro-optical transducer 40 with the optical waveguide 44 and the electrode structure 48 on surface 46 in a face-down or facing relationship with the substrate 62. The transducer 40 is positioned away from the substrate 62 by spacers 100 contained in solder columns 102. The solder columns 102 extend from the metallized area 98 on the substrate 62 to the contact areas 50 on the electro-optical transducer module 40 and secure the transducer 40 to the substrate 62. The spacers 100 are formed from a non-conductive material and have a thickness of approximately 100 microns. Solder columns 104 connect the metallized conductors 64 and 66 to the electrode structure 48 on the electro-optical transducer 40. Spacers 100 may be used in the solder columns 104 to provide additional support for the electro-optical transducer 40.

The height of the transducer waveguide structure 44 above the substrate 62 surface has an approximate range from 110 microns to 190 microns depending on the thickness of the waveguide 44. The thickness of the solder layer beneath the optical fibers 86 and 88 over areas 68 and 70 is typically in the range of 40-65 microns thus orienting the central axis of the fibers in the range of 113 microns to 140 microns. These ranges may vary depending the size of the spacers, the thickness of the metallized areas 50, 68, 70, and 98, the type of fiber used, and the thickness of the solder underneath the fibers.

It will be appreciated that the invention is not restricted to the particular embodiment that has been described, and that variations may be made therein without departing from the scope of the invention as defined in the appended claims and equivalents thereof. For example, although the invention has been described using single mode fiber for coupling optical signals to the electro-optical transducer, the invention is applicable to multimode electro-optical transducers using multimode fiber inputs and outputs. In addition, the invention has been described using an electro-optical transducer having a waveguide with a single input and output. Other type of transducers may be employed that have multiple input and output ports requiring multiple connecting optical fibers. Adding additional metallization areas with solder preforms and associated heating resistors would accommodate a transducer of this type. Alternatively, multiple metallization areas for securing optical fibers to the substrate may have solder preforms that melt at different temperatures. In this alternative, a single heating resistor may be used to heat multiple solder preforms. Further, in applications where true hermeticity is not critical and outgassing can be tolerated, organic adhesives may be used instead of solders.

I claim:

1. An electro-optical transducer comprising:
a substrate having a planar surface;

an electro-optical transducer having an optical waveguide and electrode structure formed on one surface thereof with the waveguide surface in a facing relationship with the planar surface of the substrate;

means for positioning the electro-optical transducer above the planar surface of the substrate;

means for securing the electro-optical transducer to the substrate;

means for providing an electrical connection to the electrode structure; and first and second optical waveguides affixed to the planar surface of the substrate adjacent to the electro-optical transducer for coupling an optical signal into the transducer waveguide and receiving the optical signal from the transducer waveguide.

2. The electro-optical transducer module as recited in claim 1 wherein the electro-optical transducer is lithium niobate having a titanium optical waveguide diffused therein with electrodes formed adjacent to the optical waveguide.

3 The electro-optical transducer module as recited in claim 1 Wherein the positioning means and the securing means are coextensive, the positioning means being spacing elements and the securing means being a solder column with the spacing elements being within the solder column.

4. The electro-optical transducer module as recited in claim 3 wherein the spacing elements have a diameter in the range of 100 microns.

5. The electro-optical transducer module as recited in claim 3 wherein the securing means and the connection means are one in the same.

6. The electro-optical transducer module as recited in claim 1 wherein the first and second optical waveguides are optical fibers soldered directly to the planar surface of the substrate with each optical fiber having a center axis axially aligned with the transducer waveguide.

7. An improved electro-optical transducer module having a substrate with a planar surface and first and second optical waveguides secured to the planar surface for coupling an optical signal into and out of the transducer module comprising an electro-optical transducer having an optical waveguide and electrode structure formed on one surface thereof with the waveguide surface in a facing relationship with the planar surface of the substrate for aligning with the optical waveguides and means for securing the electro-optical transducer to the substrate and means for providing an electrical connection to the electrode structure, the securing means having spacing elements for positioning the electro-optical transducer above the surface of the substrate.

8. The improved electro-optical transducer module as recited in claim 7 wherein the electro-optical transducer is lithium niobate having a titanium optical waveguide diffused therein with electrodes formed adjacent to the optical waveguide.

9. The improved electro-optical transducer module as recited in claim 7 wherein the securing means and connection means are solder columns.

10. The improved electro-optical transducer as recited in claim 7 wherein the first and second optical waveguides are optical fibers with each optical fiber having a center axis axially aligned with the transducer waveguide.

* * * * *